US006816795B2

(12) United States Patent
Vanderbeek (10) Patent No.: US 6,816,795 B2
(45) Date of Patent: Nov. 9, 2004

(54) COMPRESSED GAS SYSTEM

(76) Inventor: David Vanderbeek, 910 NW. Naito Pkwy., Apt. I 23, Portland, OR (US) 97209

( * ) Notice: Subject to any disclaimer, the term of this patent is extended or adjusted under 35 U.S.C. 154(b) by 350 days.

(21) Appl. No.: 09/953,498

(22) Filed: Sep. 14, 2001

(65) Prior Publication Data

US 2003/0065423 A1 Apr. 3, 2003

(51) Int. Cl.$^7$ ............................................. G06F 19/00
(52) U.S. Cl. ..................... 702/50; 700/275; 700/282; 700/301
(58) Field of Search ........................... 702/50; 137/110; 60/39.281, 772, 595, 596, 597; 700/275, 282, 301

(56) References Cited

U.S. PATENT DOCUMENTS 4,309,871 A * 1/1982 Venema .................... 60/39.281
5,325,884 A * 7/1994 Mirel et al. ................. 137/110
5,496,388 A * 3/1996 Tellier ............................. 96/4

OTHER PUBLICATIONS

Lawrence Berkeley National Laboratory, Improving Compressed Air System Performance: A Source Book for Industry, Apr. 1998, Motor Challenge and Compressed Air Challenge, http://www.compressedairchallenge.org/html/sourcebook.

* cited by examiner

Primary Examiner—Bryan Bui
Assistant Examiner—Hien Vo
(74) Attorney, Agent, or Firm—Chernoff, Vilhauer, McClung & Stenzel, LLP (57) ABSTRACT

A flow responsive compressor control system for a compressed gas distribution system enables operation of the ones of a plurality of compressors by selecting one of a plurality of strategies relating a flow of compressed gas and the operation of at least one compressor. A strategy is selected in response to a flow and a rate of change of pressure of compressed gas in the distribution system.

35 Claims, 9 Drawing Sheets

STAGING TABLE N

| | I | II | III | IV | V | VI |
|---|---|---|---|---|---|---|
| Usable 0<br>Base Cap 0<br>Trim Cap 0<br>Purge 0<br>Q Shift - | Usable 500<br>Base Cap 0<br>Trim Cap 695<br>Purge 185<br>Q Shift 0 | Usable 795<br>Base Cap 295<br>Trim Cap 695<br>Purge 185<br>Q Shift 695 | Usable 1130<br>Base Cap 630<br>Trim Cap 695<br>Purge 185<br>Q Shift 980 | Usable 1424<br>Base Cap 924<br>Trim Cap 695<br>Purge 185<br>Q Shift 1315 | Usable 1750<br>Base Cap 1260<br>Trim Cap 695<br>Purge 185<br>Q Shift 1610 | Usable 2050<br>Base Cap 1554<br>Trim Cap 695<br>Purge 185<br>Q Shift 2250 |
| T1 | | Compressor A | Compressor A | Compressor A | Compressor A | Compressor A | Compressor A |
| T2 | | | | | | | |
| B1 | | | Compressor B | Compressor C | Compressor C | Compressor C | Compressor C |
| B2 | | | | | Compressor B | Compressor D | Compressor D |
| B3 | | | | | | | Compressor B |

COMPRESSED GAS SYSTEM

CROSS-REFERENCE TO RELATED APPLICATIONS

Not applicable.

BACKGROUND OF THE INVENTION

The present invention relates to compressed gas systems and, more particularly, to a system for controlling and operating a plurality of compressors to efficiently supply compressed gas to a compressed gas distribution system.

Compressed gas is widely used in industry. For example, almost every industrial facility from a small machine shop to a large pulp and paper mill has some type of compressed air system. In many cases, compressed air is considered to be a "fourth utility" and is so vital that the facility cannot operate without it. Compressed air systems vary in size from a single five horsepower compressor to systems comprising many compressors and aggregating more than 50,000 hp. While compressed air is clean, readily available, and simple to use, a typical compressed air system operates with around 10% overall efficiency and compressed air is probably the most expensive form of energy in use in a facility. Improving system maintenance, reducing system pressure, and using more efficient compressors are recognized paths to improved efficiency for compressed gas systems.

For example, leakage can consume 20–30% of the compressor output. However, leakage can be reduced to less than 10% of compressor output by using good maintenance practices and reducing system pressure because leakage is proportional to the pressure drop across the leak. However, reducing the system pressure requires compressed air storage and an accurate control system to prevent the system pressure from dropping below an acceptable minimum level during periods of high or changing demand.

Figure 1:
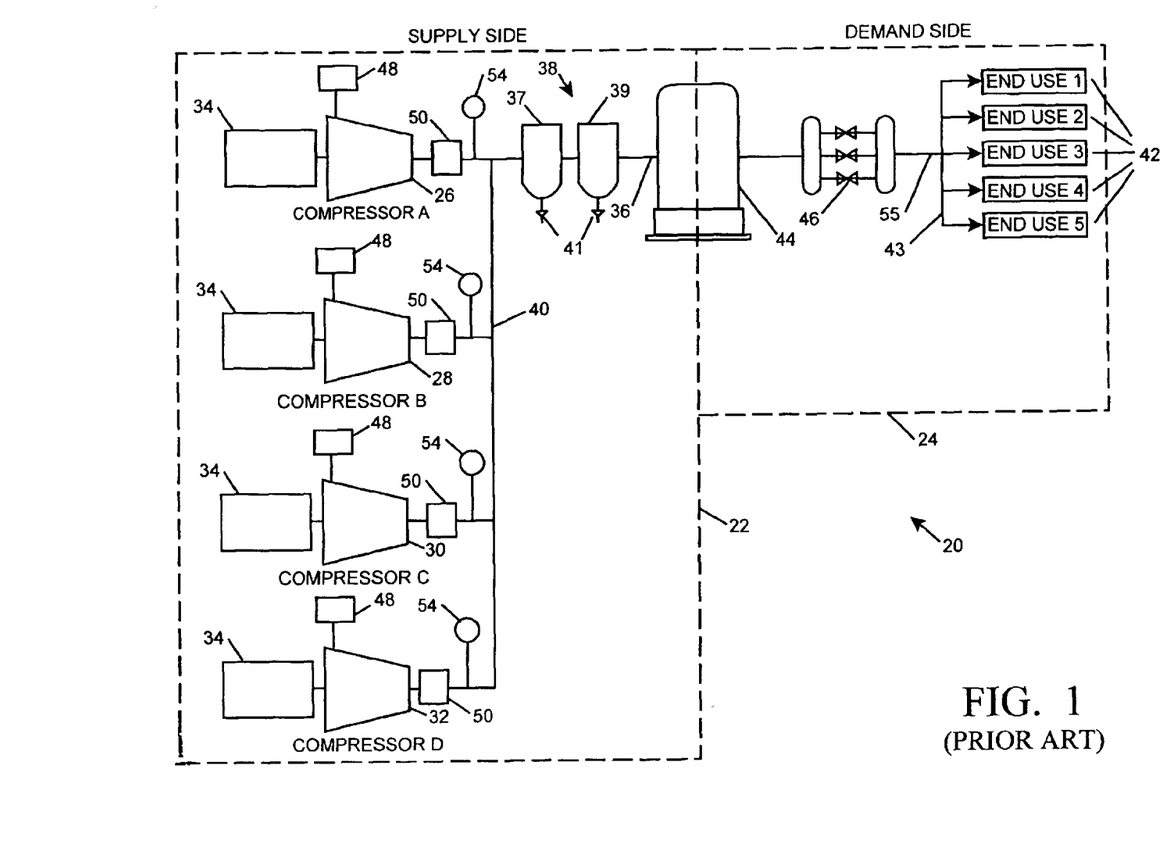
FIG. 1 is a block diagram of an exemplary compressed gas distribution system.

Referring to FIG. 1, a typical compressed gas system 20 comprises, generally, a supply side 22 (indicated by a dashed enclosure) and a demand side 24 (indicated by a dashed enclosure). The supply side 22 of the system typically includes one or more compressors 26, 28, 30, and 32, supply side piping 40 and air treatment equipment, such as an air dryer 38. Gas compressors are commonly constructed as a compressor package including a drive motor, compressor controls, and a number of accessories. The compressors 26, 28, 30, and 32 are each driven by a drive motor 34 and equipped with inlet filtration 48 to protect the compressors and downstream equipment from airborne particles in the inlet air, and a separator 50 to remove oil and moisture from the compressed gas leaving the compressor. Although not illustrated, gas compressor packages also commonly include intercoolers to cool the air between compression stages and aftercoolers to cool the compressed air discharged by the compressor. Typically, the compressor's controls (not illustrated) respond to a pressure signal, obtained from pressure sensors 54, at the discharge of the compressor package to the supply piping 40.

The demand side 24 of the system comprises distribution piping 43, including a demand header 55, leading to a plurality of end use equipment and processes 42.

The supply 22 and demand 24 sides of the system are typically separated by an air receiver or accumulator 44 and, often, a flow control 46. The accumulator 44 provides storage for a volume of compressed air and reduces compressor sequencing by permitting compressors to continue to operate when demand is momentarily reduced and providing a source of compressed air when demand momentarily increases. An appropriately sized accumulator can be used to protect end use equipment and processes having critical pressure requirements by controlling the amount and rate of system pressure change in response to demand events. The flow control 46 reduces pressure fluctuations in the demand side by adjusting the flow of compressed gas from the accumulator 44 to the demand side 24 of the system in response to changes in demand by the end uses 42. However, the supply side 22 of a compressed gas system has, essentially, a fixed volume and the pressure in the supply side will decrease in response to consumption of gas by the demand side 24 unless and until there is sufficient flow from the compressors to replace the gas being transferred to the demand side of the system. Likewise, when demand is reduced, the supply pressure, typically measured in the supply side header 36 or the accumulator 44, will rise until the compressor output is reduced to match the demand. If the system does not include a flow control 46, changes in demand by the end uses 42 produce immediate changes in the pressure in the demand header 55 resulting in rapidly fluctuating pressure in the accumulator 44.

Figure 2:
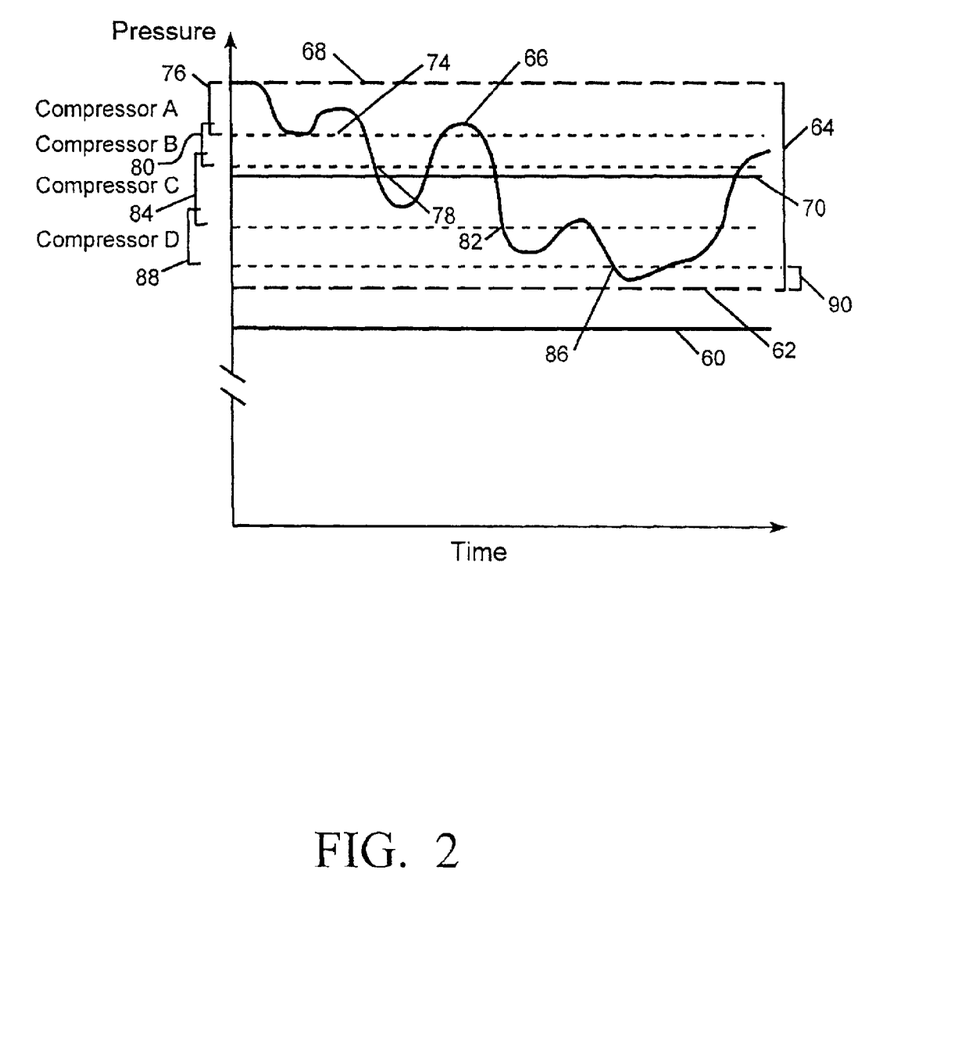
FIG. 2 is a graphical representation of exemplary gas pressures of the exemplary gas compression system of FIG. 1.

Compressed gas systems are designed to operate within a fixed pressure range and to deliver to end uses 42 a volume of gas that varies with end use demand at a pressure in excess of a minimum pressure. Referring to FIG. 2, to compensate for pressure drops in the distribution piping 43 and to ensure that end uses 42 receive gas at a pressure in excess of the minimum, a minimum demand pressure 60 is maintained in the demand header 55. Likewise, to compensate for pressure drops between the accumulator 44 and the demand header 55, a minimum supply pressure 62, in excess of the demand pressure 60, is maintained in the accumulator 44 or supply header 36. The compressor control system typically operates in a fixed pressure range 64 (indicated by a bracket) adding or removing compressor capacity from the system in response to pressure changes resulting from demand in an attempt to keep the supply pressure 66 above the minimum supply pressure 62.

Air compressors operate most efficiently at full load and are, therefore, typically switched in and out of the system when the local pressure, typically measured at the outlet of the compressor package (sensor 54) reaches the limits of a control range established for the compressor. The compressor may be sequenced by controlling the drive motor 34 with a simple start-stop pressure switch but frequent cycling can cause overheating and wear of the motor and compressor. To reduce cycling of the drive motor, many compressors include a load-unload control that enables disconnecting the output of the compressor from the system while the drive motor continues to drive the compressor at full speed. However, an unloaded compressor typically consumes 15–60% of full load power while delivering no useful work to the system and lengthy periods of unloaded operation are detrimental to system efficiency.

A modulating or throttling inlet control can be used on a rotary screw type compressor to adjust the compressor's output so that it more closely matches demand keeping the system pressure within the control range without unloading the compressor. However, when fully throttled, these compressors continue to operate against the system's pressure and typically consume approximately 70% of full power. A variable speed drive is a more energy efficient means of regulating the output of a compressor to more closely match the system demand, but variable speed drives are relatively expensive. In a typical compressor operating scenario, a plurality of compressors, each operating at full capacity, are sequenced in and out of the distribution system in an attempt to match the combined compressor output to the system demand. In the alternative, one or more compressors with variable output may be used to fine tune the total compressor output over some limited range to reduce sequencing of fixed capacity compressors.

Automatic compressor control systems comprise generally sequencing controls and network controls. Sequencing controls or sequencers are devices used to sequentially load and unload a plurality of compressors in response to changes in the local system pressure. Sequencers can provide a fairly tight control range for the compressor and can be arranged to alter the order in which compressors are sequenced to balance the duty cycle on a plurality of compressors. However, sequencers rely on a local pressure signal from the outlet of the compressor package and variations in pressure throughout a system resulting from pressure drops and dynamic pressure fluctuations limit the use sequencers to controlling compressors at a common location.

Network controls typically utilize microprocessor-based controllers to provide a combination of system control functions and control of individual compressors. The controllers are linked so that operating information at various points in the system and the status of compressors distributed about the facility can be shared. One of the linked controllers is typically designated as the leader providing system operating decisions in response to pressure at various points in the supply side of the system. The effect is a tight control range for individual compressors and a coordinated response to changes in supply side pressure. The initial cost of network controls can be high compared to sequencers but the cost is often offset by reductions in operating costs.

The efficiency of a gas compression system can be increased by reducing the pressure of the gas in the system. A two psi. reduction in system pressure can reduce the operating cost of a typical compressed air system by approximately 1%, reducing leakage and energy consumed to compress the gas to a higher pressure. However, even with very accurate controls for individual compressors, the range of operating pressures 64, and, therefore, the average supply pressure 70, is determined, in large part, by the sequential arrangement of the operating pressure ranges for the sequenced compressors. For example, compressor A is to be loaded when the supply pressure 66 in the supply header 36 or accumulator 44 drops below the lower limit 74 of its operating range 76 (indicated by a bracket) (adjusted for a pressure drop between the outlet of the compressor 54 and the supply header 36). If the volume of air being added to the system by compressor A exceeds the demand, the supply pressure 66 will rise but to avoid frequent cycling of the compressor, compressor A will not be unloaded until the supply pressure reaches the upper limit 68 of its operating range 76. If, on the other hand, demand again increases, the supply pressure 66 will drop until the lower limit 78 of the operating range 80 (indicated by a bracket) for compressor B is reached, causing compressor B to be sequenced. If the demand continues to increase, the system pressure may drop below the lower limit 82 of compressor C's operating range 84 causing its capacity to be sequenced into the system. The lower limit 86 of the operating range 88 of the last compressor in the sequence (compressor D) is typically set somewhat above the minimum supply pressure 62 so that a rapid increase in demand will not cause the supply pressure 66 to drop below the minimum pressure before compressor D's capacity can be added to the system. As a result, the operating supply pressure range 64 of the system is the sum of the overlapping individual operating ranges 76, 80, 84, and 88 of the system's compressors and a pressure margin 90 that protects end uses from exposure to pressures below the minimum allowable supply pressure 62. Improving system efficiency by reducing the average supply pressure 70 is limited by the width of the operating pressure ranges for the individual compressors and the cumulative nature of the sequential pressure ranges for a plurality of compressors supplying compressed gas to the distribution system.

What is desired, therefore, is a system for controlling the operation of at least one compressor of a compressed gas distribution system that facilitates operation of the distribution system in a manner that reduces average pressure for improved system efficiency.

DETAILED DESCRIPTION OF THE INVENTION

FIG. 1 is a block diagram of an exemplary compressed gas distribution system 20. The compressed gas system 20 comprises generally a supply side 22 (indicated by a dashed enclosure) and a demand side 24 (indicated by a dashed enclosure). The supply side 22 of the exemplary system includes four gas compressors, designated "A" 26, "B" 28, "C" 30, and "D" 32. A typical compressed gas distribution system includes several compressors and may include compressors of differing types and capacities. Compressors may be single speed, fixed displacement machines or may be equipped with variable speed drives or inlet throttling so that the compressor's capacity can be varied to supply changing flow demand. Each of the compressors illustrated in FIG. 1 is driven by a separate motor 34, although more than one compressor might be driven by a single motor. Typically, gas compressors are equipped with several accessories to treat the air before or after compression. For example, the compressors 26, 28, 30, and 32 are equipped with air inlet filters 48 to protect the compressors and downstream equipment from airborne particles in the intake air. Although not illustrated, the compressors may also be equipped with intercoolers to cool the air between multiple compression stages and aftercoolers to cool the compressed air discharged by the compressor. Moisture and lubricant are typically removed from the compressed air by a separator 50 connected to the output of each compressor. Each compressor 26, 28, 30, and 32 is equipped with an outlet pressure sensor 54 to measure the local pressure at the connection of a compressor package and the supply piping 40.

Compressed air leaving the separator 50 is warm and saturated with moisture. To prevent moisture from condensing out of the air as it cools in the system piping, compressed air systems are typically equipped with an air dryer. The exemplary compressed air system 20 is equipped with a "twin tower" regenerative air dryer, indicated generally as 38. Moist compressed air is introduced to one of the towers, for example tower 37, where it flows through a desiccant. The water vapor is trapped in pores on the surfaces of beads of desiccant and dry air flows out of the air dryer. A controller shuts off the flow of air to the first tower 37, vents the first tower to the atmosphere, and starts the flow of air to the second tower 39. Dry air from the second tower 39 is introduced to the first tower 37 and flows through the desiccant. The depressurized desiccant gives up the trapped moisture to the air and the air and moisture are discharged to the atmosphere through a discharge valve 41. The purge air used to dry the desiccant can range from 3–18% of the air flowing in the system.

From the air dryer 38 the compressed gas passes through a supply side header 36 to an air receiver or accumulator 44 at the boundary of the supply 22 and demand 24 sides of the system. The accumulator 44 provides compressed air storage for satisfying momentary demand events reducing fluctuations of supply pressure which is typically measured in either the supply header 36 or the accumulator 44.

Flow from the accumulator 44 to the demand side 24 of the system is controlled by a flow control 46. The flow control 46 monitors deviations in demand pressure in the demand header 55 in relation to a set point pressure. Deviations in demand pressure from the set point pressure are a function of the flow being demanded by the end uses of compressed gas 42. In response to a pressure deviation, a signal is generated by a control directing flow control valves in the flow control 46 to increase or decrease the flow of compressed air from the accumulator 44 to the supply side piping 43.

As the rate of consumption of air by the end uses 42 changes, the flow control 46 responds by increasing or decreasing the flow from the accumulator 44 to match demand. Since the volume of compressed air available from the supply side 22 is relatively constant for any particular combination of compressors operating according to an operating scenario, the supply pressure will decrease in response to an increase in demand and increase in response to a reduction in demand. To prevent the demand pressure in the demand header 55 from dropping below an acceptable minimum pressure compressor capacity must be added to the system to compensate for increased demand. Likewise, when demand decreases, compressor capacity must be removed from the system to avoid wasteful compression of gas that must be vented to maintain an acceptable maximum system pressure.

Referring to FIG. 2, the supply pressure 66 of a typical compressed gas system ranges between an upper 68 and a lower 62 limit. The lower limit 62 of supply pressure is generally established to maintain a minimum demand pressure 60 to protect the functionality of the end uses of the compressed gas. The upper limit 68 of the supply pressure operating range 64 is typically equal to the lower limit 62 plus the summation of the overlapping operating pressure ranges, for example ranges 76, 80, 84 and 88 established for the individual compressors making up the system and an error margin 90 between the loading pressure of the last compressor and the minimum supply pressure 62. The present inventor realized that the energy efficiency of compressed gas systems is limited, in part, by reliance on supply pressure as a proxy for system demand and the sequential arrangement of operating pressure ranges for a plurality of compressors supplying the demand. The objective of energy efficient compressor operation is to match the total output of one or more compressors having discrete outputs to varying flow demands so that the average pressure of the compressed gas more closely matches the minimum demand pressure 60 and energy is not wasted over pressurizing gas to protect end uses from under pressurization. The present inventor realized that a control system more directly responsive to flow requirements of the system would make it possible to reduce the average pressure supplied by the compressors and to substantially reduce the amount of energy required to satisfy the demand of a system's end uses. Further, the inventor realized that a flow-responsive control in conjunction with a flow control would enable connection of some of the system's compressors directly to the demand side of the system minimizing the pressure of the compressed output and maximizing the energy efficiency of these compressors.

Figure 3:
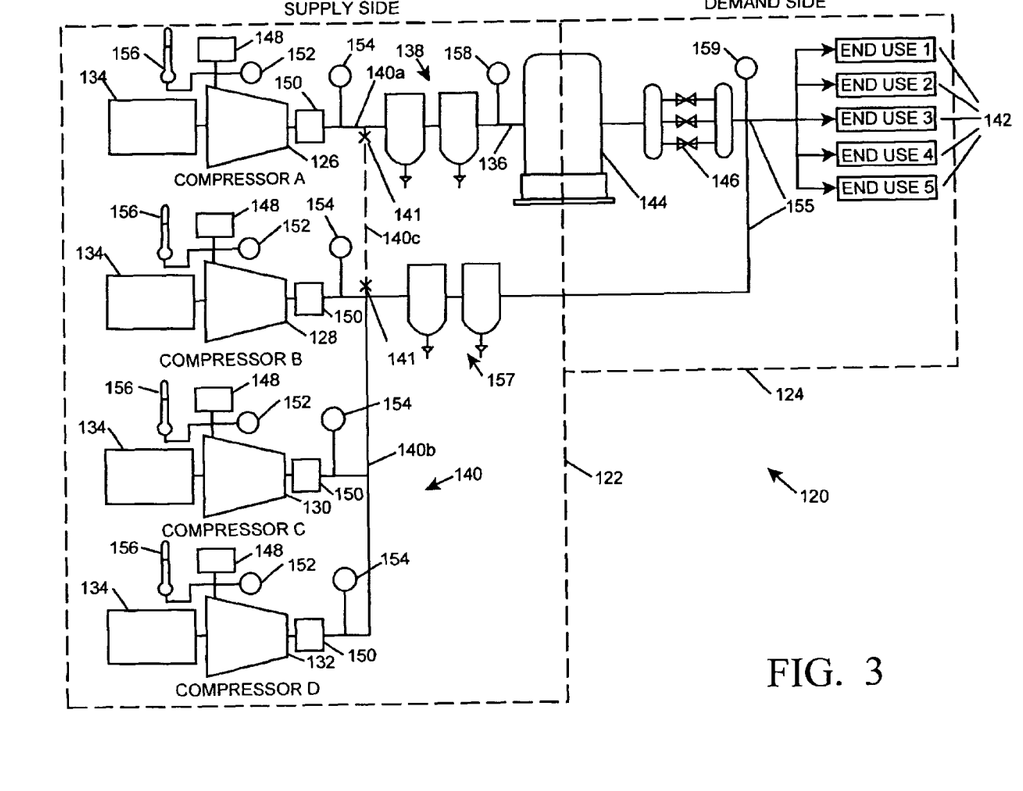
FIG. 3 is a block diagram of an exemplary compressed gas distribution system employing a flow-responsive compressor control system.

FIG. 3 is a block diagram of an exemplary compressed gas distribution system 120. The compressed gas system 120 comprises generally a supply side 122 (indicated by a dashed enclosure) and a demand side 124 (indicated by a dashed enclosure). The supply side 122 of the exemplary system includes four gas compressors, designated "A" 126, "B" 128, "C" 130, and "D" 132. The individual compressors may be single speed, fixed displacement machines or may be equipped with variable speed drives or inlet throttling. Each of the compressors illustrated in FIG. 3 is driven by a separate motor 134, although more than one compressor might be driven by a single motor. Each of the compressors 126, 128, 130, and 132 is equipped with an air inlet filter 148 and a separator 150 which function in the same manner as air inlet filters 48 and separators 50 as described above and may be equipped with other accessories which are not illustrated. Each compressor 126, 128, 130, and 132 is equipped with an inlet 152 and an outlet 154 pressure sensor and an inlet 156 temperature sensor. Sensors may be combined if the measured parameter is common to one or more compressors. For example, co-located compressors may rely on a common inlet temperature sensor 156.

The compressed gas exiting the compressors 126, 128, 130 and 132 enters supply side piping designated generally as 140. FIG. 3 schematically illustrates three compressors 128, 130, and 132 connected to a single pipe 140b and a single compressor 126 connected to a second pipe 140a. However, it will be understood that supply piping is commonly provided and equipped with appropriate valving so that the compressors 126, 128, 130, and 132 can be connected to pipe 140a and 140b in several combinations. For example, all four compressors can be connected to pipe 140a by opening valves 141 to permit flow through pipe 140c (dashed to indicate no flow).

Compressed gas leaving the separators 150 is warm and saturated with moisture. To prevent moisture from condensing out of the air as it cools in the system piping, the system 120 includes a plurality of "twin tower" regenerative air dryers that operate as described above with regard to air dryer 38. The air dryers 138 and 157 are connected to the supply pipes 140a and 140b, respectively.

Compressed gas exiting the air dryer 157 enters demand side piping at the demand header pipe 155 at demand pressure. If one or more of compressors 128, 130, and 132 are operating, the flow, referred to herein as "base flow" or "base capacity," is pressurized only to the demand header pressure which is less than the supply pressure in accumulator 144 and substantially less than the outlet pressure of a sequenced compressor in system 20.

The additional flow of compressed gas necessary to maintain the minimum demand pressure for the end uses 142 or "trim flow" is supplied by compressor A 126. Compressed gas at supply pressure from compressor A passes through the air dryer 138 and the supply side header 136 into to an air receiver or accumulator 144 at the boundary of the supply 122 and demand 124 sides of the system. Supply pressure is monitored by sensor 158 in either the supply header 136 or the accumulator 144. The flow of compressed gas from the accumulator 144 to the demand side 124 of the system is controlled by a flow control 146 that functions as described above with regard to flow control 46.

Figure 4:
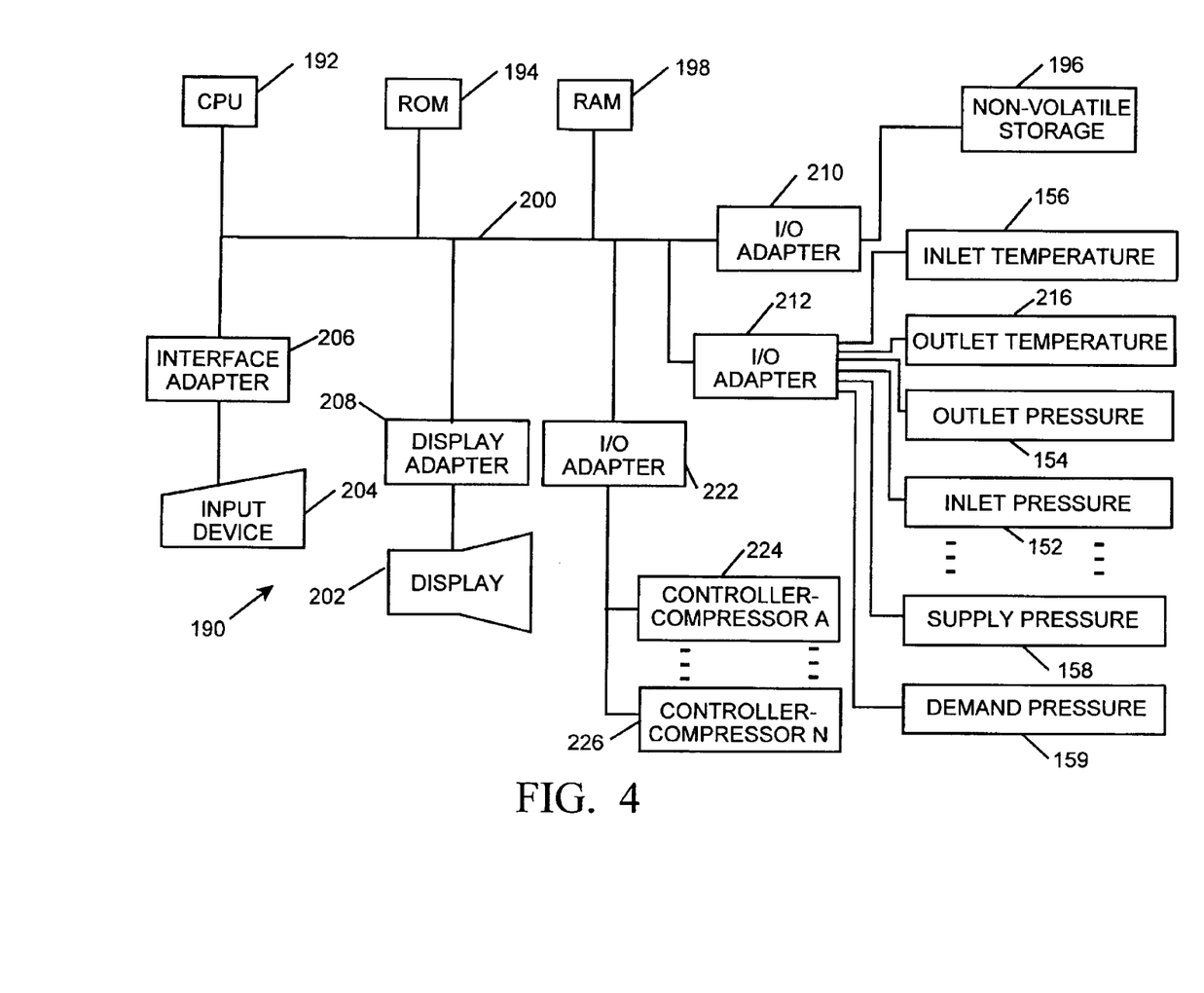
FIG. 4 is a block diagram of an exemplary computer system environment for a flow-responsive gas compressor control system.

The flow-responsive compressor control system is typically implemented as an application program for use in conjunction with a digital computer system. Although the control system can be used with computer systems of many configurations, FIG. 4 illustrates, in block form, a typical microprocessor-based computer system 190 useful for storing and running an application program implementing the control system. The exemplary computer system 190 includes a microprocessor-based, central processing unit (CPU) 192 that fetches data and instructions from a plurality of sources, processes the data according to the instructions, and stores the result or transmits the results in the form of instructions to control some attached device. Further, the CPU 192 is a synchronous device and is programed to operate as a timer of intervals between events. In the flow responsive control system, the CPU 192 is programed to perform as a strategy shift timer timing the interval between shifts in operating strategy for the compressors, as a flow interval timer to time an interval in which flow exceeds a shift flow for a strategy, and a pressure rate of change timer to time an interval over which a rate of change of a pressure exceeds a threshold rate of change. Typically, basic operating instructions used by the CPU 192 are stored in nonvolatile storage, such as read only memory (ROM) 194. Application programs, such as the flow-responsive compressor control system, and related data, such as a plurality of compressor staging tables used by the compressor control system, are typically stored on a nonvolatile mass storage device 196, such as a disk storage unit. The data and instructions are typically transferred from the mass storage device 196 to random access memory (RAM) 198 and fetched from RAM by the CPU 192. Data and instructions are typically transferred between the CPU 192, ROM 194, and RAM 198 over an internal bus 200.

The exemplary computer system 190 also includes several attached devices including a display 202 and an input device 204, such as a keyboard or touch screen display. Data is transferred between the attached devices and the CPU 192 by a communication channel connected to the internal bus 200. Typically, each device is attached to the internal bus by way of an adapter, such as the interface adapter 206 providing an interface between the input device 204 and the internal bus 200 and the display adapter 208 providing an interface between the display 202 and the internal bus. Likewise, the nonvolatile mass storage unit 196 is connected to the internal bus 200 by an input-output (I/O) adapter 210.

The control system monitors the performance of the compressed gas distribution system through a plurality of sensors connected to the internal bus 200 through an I/O adapter 212. Typically, the control system monitors the compressor inlet temperature with an inlet temperature sensor 156, inlet pressure with an inlet pressure sensor 152, and outlet pressure with an outlet pressure sensor 154 for each of the compressors. An outlet temperature sensor 216 may also be used to monitor the performance of the compressor and determine its need for maintenance. A set of sensors for monitoring a single compressor is illustrated in FIG. 4. An additional set of similar sensors (not illustrated) is typically monitored for each additional compressor, although a single sensor may monitor more than one compressor when the monitored parameter is common to more than one compressor. In addition, the demand pressure in the demand side header 155 is monitored by a demand pressure sensor 159 and the supply pressure in the supply header 136 or accumulator 144 is monitored by pressure sensor 158.

When a compressor operating strategy is selected by the CPU 192, signals are sent to compressor controllers, such as the controller for compressor A 224 or the controller for compressor N 226, that are connected to the internal bus 200 by an I/O adapter 222, operate the appropriate compressor as specified by the operating strategy. The compressor controllers 224 and 226 stage (start and stop the drive motor 134) and modulate the output of the appropriate compressor (typically by loading or unloading the compressor or by varying the capacity of the compressor) in response to the signal from the CPU 192.

Figure 5:
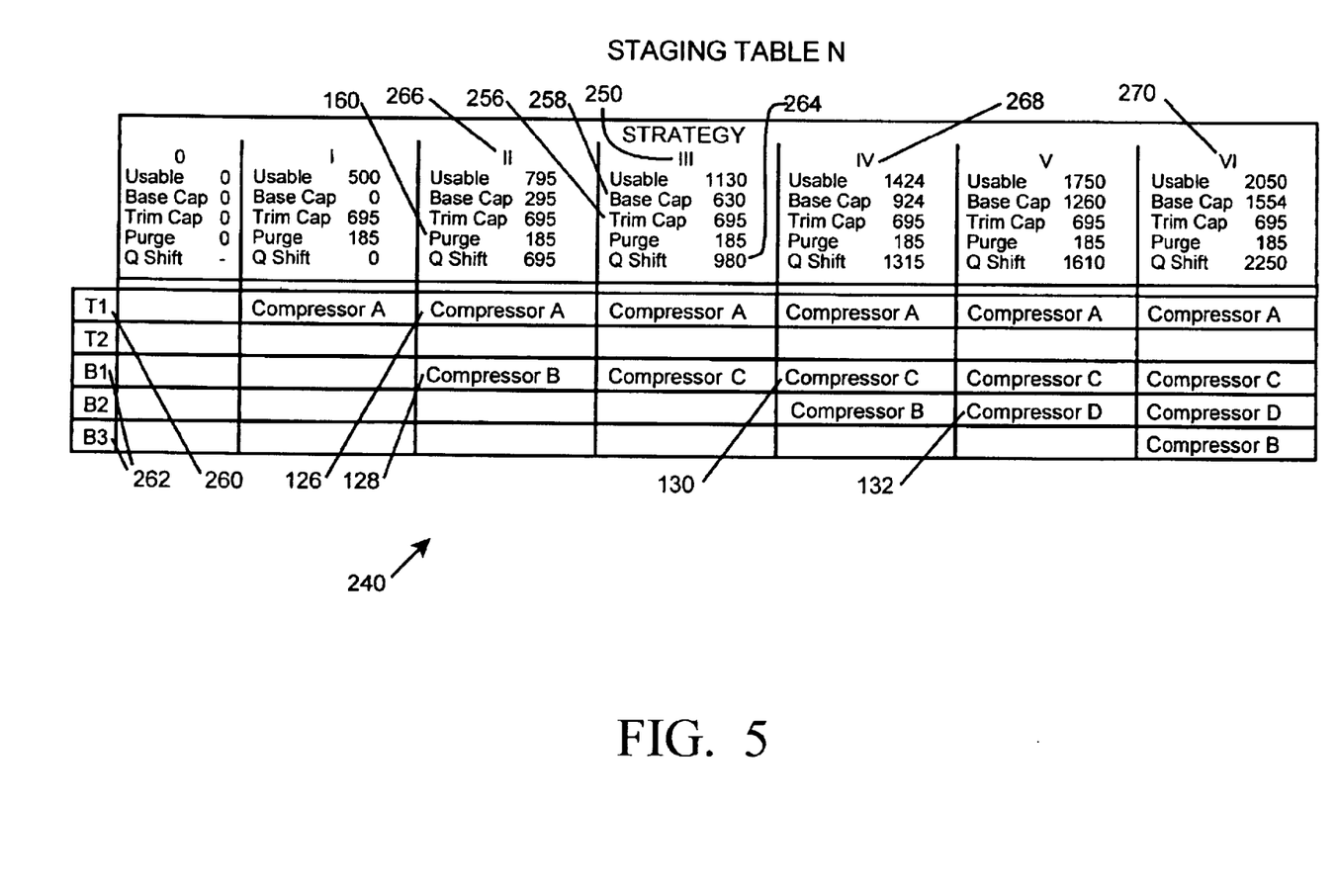
FIG. 5 is a tabular representation of a staging table relating a plurality of compressor operating strategies and resulting flows for an exemplary compressed gas distribution system.
Figure 6:
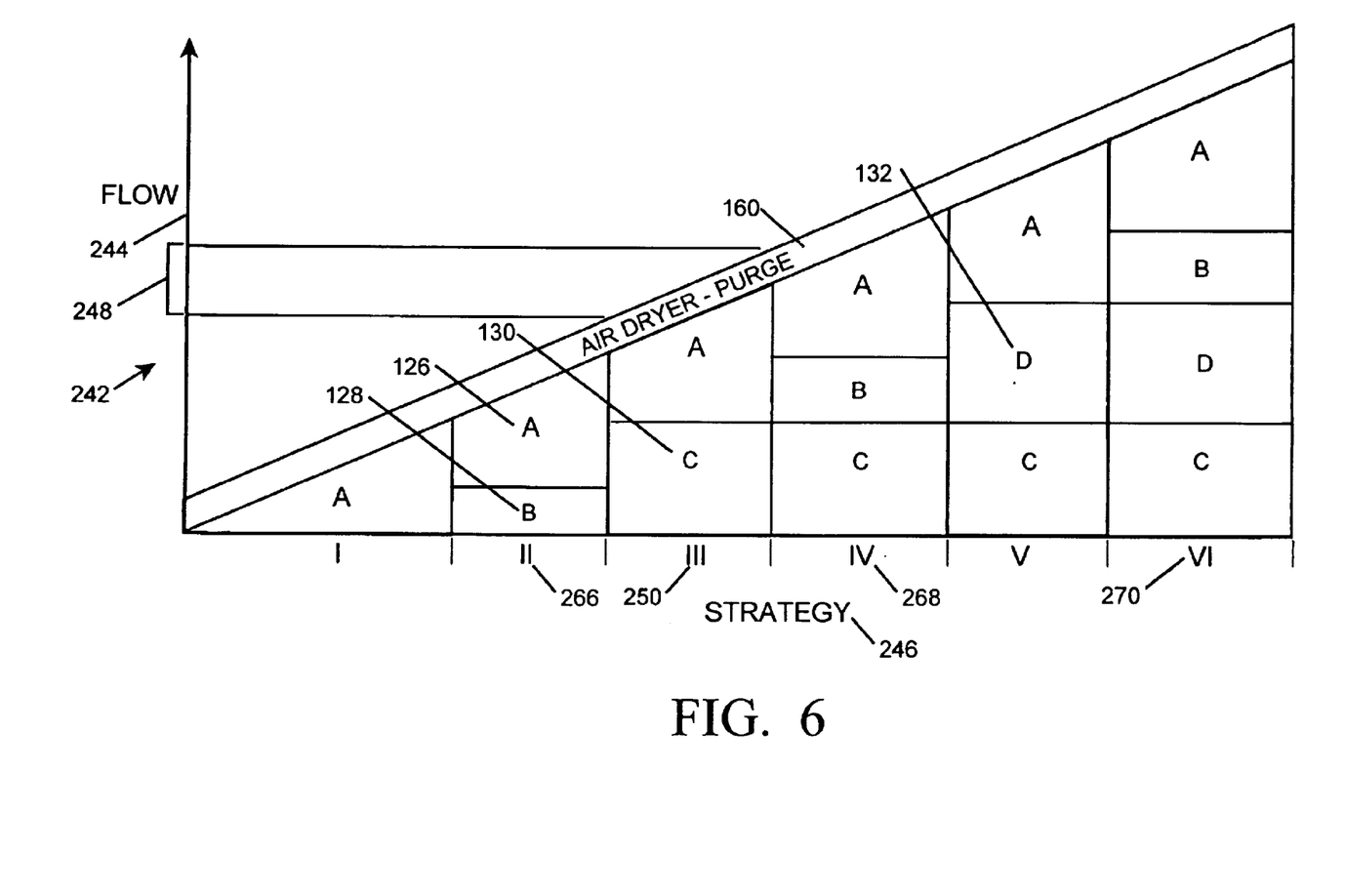
FIG. 6 is a staging diagram graphically relating compressor operating strategies and resulting flows of the staging table of FIG. 5.

The control system is typically implemented as an application program including a plurality of staging tables, each comprising a plurality of strategies relating a flow of compressed gas in the distribution system 120 and the operation of at least one compressor. To aid in visualizing the operation of the compressor control system, an exemplary staging table 240 is illustrated in FIG. 5 and a comparable staging diagram 242, graphically illustrating the relationship of flow 244 and compressor operating strategy 246 for an exemplary compressed gas system is illustrated in FIG. 6. The staging table 240 and diagram 242 illustrate a plurality of operating strategies for a compressed gas system that includes four available compressors designated "A" 126, "B" 128, "C" 130, and "D" 132 to correspond with the designation of compressors A, B, C, and D in the exemplary system 120. As illustrated, the staging table 240 typically designates which of the available compressors is to be a base compressor 262 and which is to be a trim compressor 260 and the available base and trim capacities or flows under each operating strategy. Further, the table 240 indicates the portion of the available flow that will be provided as base capacity 258 and as trim capacity 256 and the portion of the flow to be consumed to purge the system's air dryers 160. The control system typically includes a plurality of staging tables, similar to table 240, with a different table that includes a plurality of strategies for each combination of compressors that may be available to compress gas for the system at any time.

As illustrated by the exemplary staging table 240 and staging diagram 242, the flow-based control system supplies a flow demanded by the end uses by operating one or more of the available compressors according to a strategy appropriate for the flow. For example, as illustrated in the staging diagram 242 if demand falls within the flow range 248 for strategy III the control system will supply the demand by operating compressors C (130) and A (126) according to strategy III 250. As illustrated in FIG. 3, compressor C 130 is connected to the demand header 155 and operated as a base compressor 262 supplying base capacity or flow 258 to the demand side of the system. Base compressors, such as compressor C 138 in operating strategy II, supply their full output (630 CFM for compressor C) to the demand side 124 of the system at some of the lowest pressures in the system and, therefore, their efficiency is maximized. To adjust total compressor capacity to demand changes within the range of flows for a strategy, the control system modulates the output of one or more trim compressors 260 supplying compressed air to the accumulator 144. For example, if the demand varies, within the flow range of strategy III 250, the control will modulate the output of trim compressor A by loading or unloading the compressor or varying its capacity up to 695 CFM to compensate for the change. The energy efficiency of the system 120 is substantially improved over that of system 20 because a substantial part of the flow of compressed gas is being provided by base compressors operating at full capacity and at one of the lowest pressure in the distribution system (approximately demand pressure 60). Additional flow and pressure necessary to satisfy demand is provided by a trim compressor 260 which is operating at supply pressure 66. However, since the control system does not rely on sequential operating pressure ranges a much narrower supply pressure range 64 is possible with the trim compressors operating at pressures closer to the minimum supply pressure 62 for additional efficiency gains.

As illustrated by the exemplary staging table 240 and staging diagram 242, if the system operating pursuant to a first strategy cannot satisfy a changing demand by modulating the trim compressor, the control system selects a new strategy to stage at least one compressor to supply a flow to satisfy the new demand. With the exemplary system 120 operating in strategy III 250, if the demand for compressed air falls below the shift point flow (Q shift) 264, the required flow can be supplied by strategy II 266 and compressor C 130 with its greater displacement and higher energy requirements can be unloaded and the smaller displacement compressor B 128 can be staged and loaded to supply the base capacity flow according to strategy II. Likewise, if system demand exceeds the capacity of compressors A 128 and C 130 in strategy III 250, compressor C 130 can be staged and loaded to provide additional flow according to strategy IV 268.

Figure 7A:
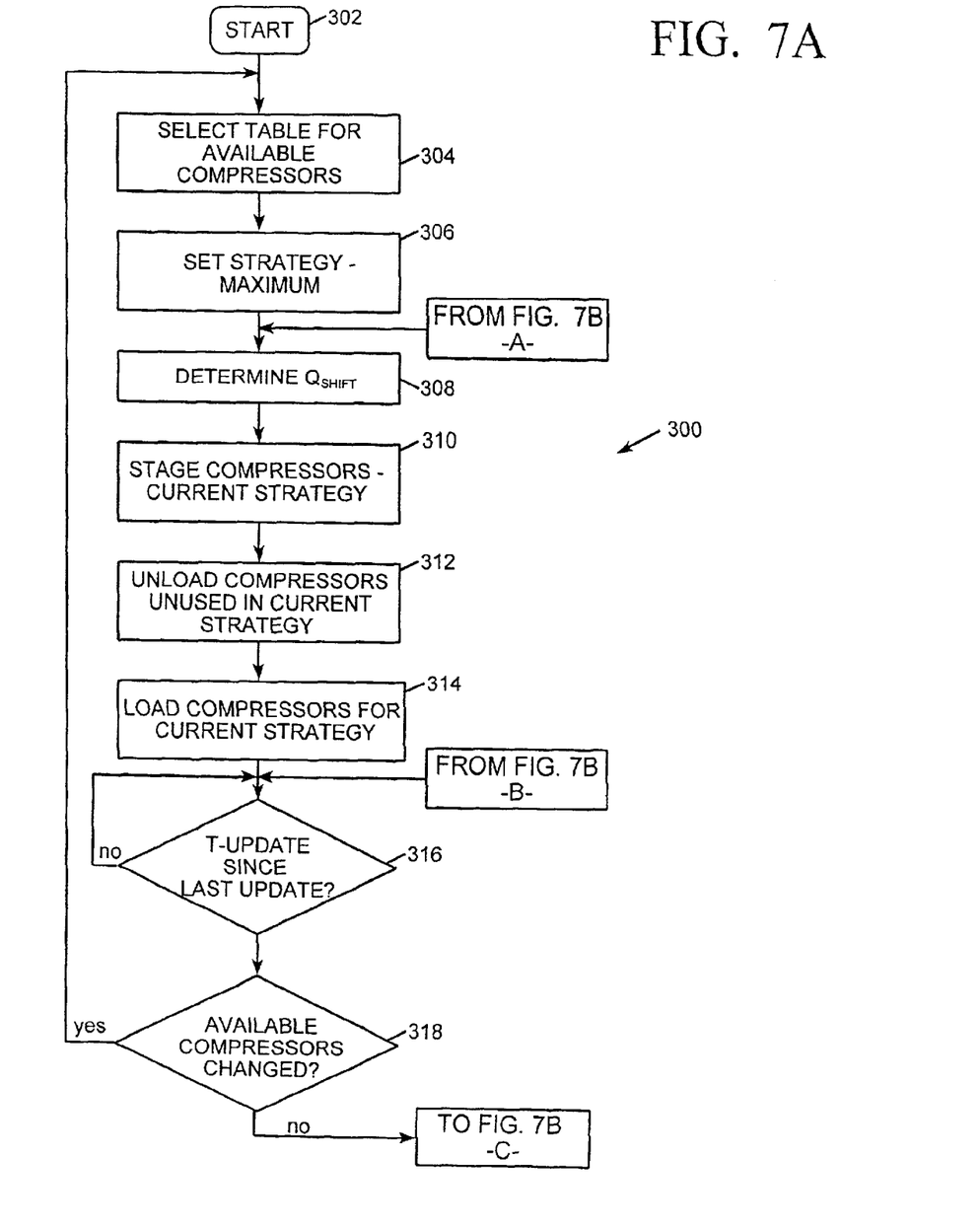
FIG. 7A is a flow diagram for the flow-responsive compressor control system.
Figure 7B:
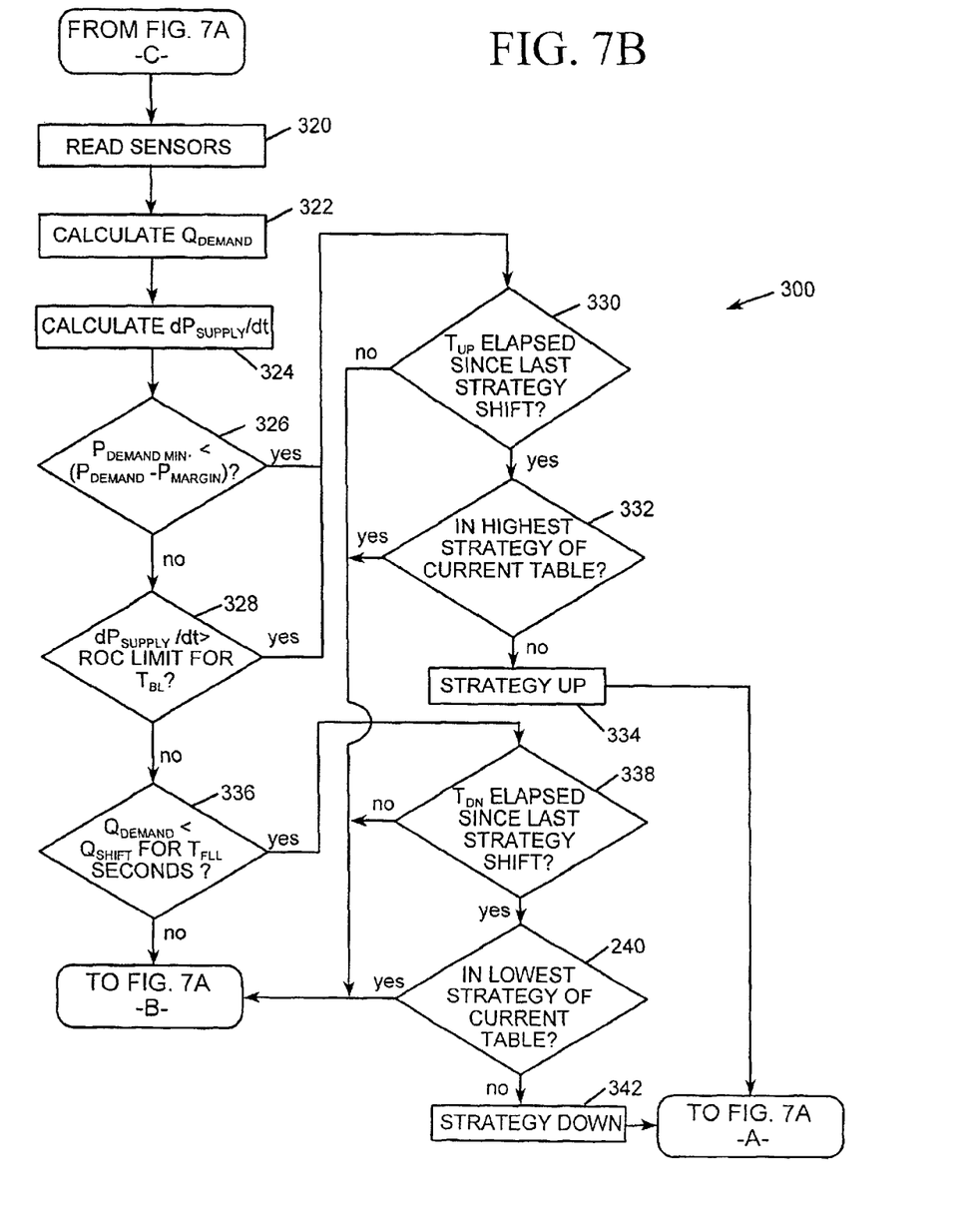
FIG. 7B is a continuation of the flow diagram of FIG. 7A.

The operation of the control method 300 is illustrated in the flow diagrams of FIGS. 7A and 7B. As illustrated, when the control method is activated 302, the method selects a staging table 304, similar to the exemplary table 240, that can be implemented with the available compressors. The system first selects the maximum strategy 306 (the strategy that produces the maximum flow) available in the selected staging table. In the case of the staging table 240, the maximum strategy is strategy VI 270 which utilizes the four available compressors, A 126, B 128, C 130, and D 132. The control then determines the strategy shift gas flow (Q shift) for the selected strategy 308. In the case of strategy VI of staging table 240, a strategy shift flow of 2250 CFM is obtained from the table. The strategy shift flow for a strategy is the maximum flow available from the compressors being operated according to the next lower strategy. If the control system senses demand is less than the shift point (Q shift) the control system will select the next lower strategy and begin operating according to that strategy.

Following selection of a strategy 306 and determination of the appropriate shift point 308, the control system signals the compressor controllers 224–226 to stage or start the operation of the compressors used in the current strategy that are currently not operating 310. For example, if a prior strategy required only compressors A, C, and D, the control would start or stage compressor B for as required for strategy VI 270 according to staging table 240. When the compressors of the current strategy are staged, the control signals the appropriate compressor controller 224–226 to unload any currently operating compressor which is not required by the current strategy 312. For example, when shifting to strategy III 250 from strategy II 266 as illustrated in staging table 240, compressor C will be unloaded following staging of compressor B. Unloaded compressors will operate for a period of time and then be shut down by the control system. The startup of compressors for a strategy is completed by loading any compressors required by the strategy that are currently running but unloaded (disconnected from the distribution system) 314.

Following initiation of a strategy, the control system waits for a period (T UPDATE) before undertaking updating of the strategy 316 to avoid unnecessary shuffling of strategies and compressors. As a first step in updating the strategy, the control determines if the available compressors have changed from the compressors available when the current strategy was selected 318. If the available compressors have changed, the control returns to step 304 and selects a new staging table based on the available compressors, selects the maximum strategy available in the new staging table 306 and performs the compressor loading and unloading steps again. If the available compressors are unchanged 318, the control begins an evaluation of conditions prevailing in the system under the current strategy by reading 320 the sensors 152, 154, 156, 158, and 159 providing data related to the pressures and temperatures in the system.

From the sensor data, the CPU 92 calculates the system's flow demand (Q Demand) 322 and the time rate of change of supply pressure (dP/dt) 324. The system demand is typically determined by summing the outputs of compressors operating according to the strategy and the output of each compressor is typically determined from data supplied by the manufacturer and stored in the nonvolatile mass storage 196 relating the output of the compressor to the inlet temperature and the inlet and outlet pressures sensed by sensors 152, 154, and 156. The supply pressure sensor 158 provides the data for determining the rate of change (dP/dt) of the supply pressure 324.

A minimum demand or set point pressure 60 for the system is compared to a difference between the demand pressure in the demand header 155 and a demand pressure margin specified to protect the system from under pressurization. If demand pressure measured in the demand header less the demand pressure margin is less than minimum demand pressure 60 insufficient compressed air is being supplied to the demand header to satisfy demand and an increase in strategy with additional compressor capacity is indicated. If the demand pressure measured by sensor 159 less the demand pressure margin is greater than the minimum demand pressure 60, the demand side of the system 124 is receiving sufficient flow and a change in strategy is not indicated by this criterion. However, a sustained high rate of change of supply pressure measured at the supply header 136 or accumulator 144 indicates a significant demand event and a higher strategy with additional capacity may be warranted to prevent the system pressure from dropping below the minimum demand pressure 60 in the future. Therefore, if the time rate of change of supply pressure exceeds a threshold rate of change for an interval (T BL), the control system will attempt to increase the strategy to provide additional flow to meet expected demand 328. To prevent rapid shifting between strategies as a result of short term demand events, the rate of change limit must be exceeded for a rate of change interval (T BL) to indicate an up shift in strategy.

If an up shift in strategy is indicated by one of steps 326 and 328, the shift up in strategy 334 may be delayed if an up shift delay interval (T MSR) has not elapsed since the last strategy shift 330. Providing a delay between strategy shifts prevents strategy oscillation, particularly when the system is operating near the pressure and rate of change limits. If the proper interval has elapsed since the last strategy shift, an up shift in strategy may still be delayed if the current strategy is the highest strategy available for the current staging table 332. For example, if the system is operating in strategy VI of the table 240, the capacity cannot be increased with the available compressors. If an up shift in strategy is indicated and not delayed, the control selects the next higher strategy 334 for the current staging table, determines a shift point for the new strategy 308 and begins staging compressors 310 to implement the strategy. If the indicated up shift in strategy is delayed because insufficient time has elapsed since the last strategy change 330 or because the current strategy is the maximum available 332, the control checks to see if sufficient time has elapsed since the last update 316 and if the available compressors have changed 318 before again updating the strategy choice.

On the other hand, if an up shift in strategy is not indicated by steps 326 and 328, the control determines if reduced compressor capacity produced by a strategy downshift is warranted. The output of the compressors (Q demand), calculated in step 322, is compared to the strategy shift flow point (Q shift) of the current strategy by the CPU 192. If the demand flow (Q demand) has been less than the strategy shift flow (Q shift) for an interval (T FLL), a downshift in strategy is indicated 336. Comparing the demand flow to the shift point for an interval of time prevents unnecessary strategy shifting due to momentary demand events, particularly when the system is operating at flows near the strategy shift flow. If a strategy downshift is not indicated by step 336, the control returns to step 316 to determine if sufficient time has elapsed since the last update.

Even if a downshift in strategy is indicated by step 336, the strategy downshift 340 can be delayed if a prescribed strategy shift time interval (T DN) has not elapsed since the last strategy shift 338 or if the current strategy is the lowest strategy of the current staging table. If the shift in strategy is delayed, the control returns to step 316. If the down shift is not delayed, however, the method selects the next lower strategy 342 and returns to step 308 to determine the shift point of the new strategy and begin staging the compressors required by the new strategy 310.

Figure 8:
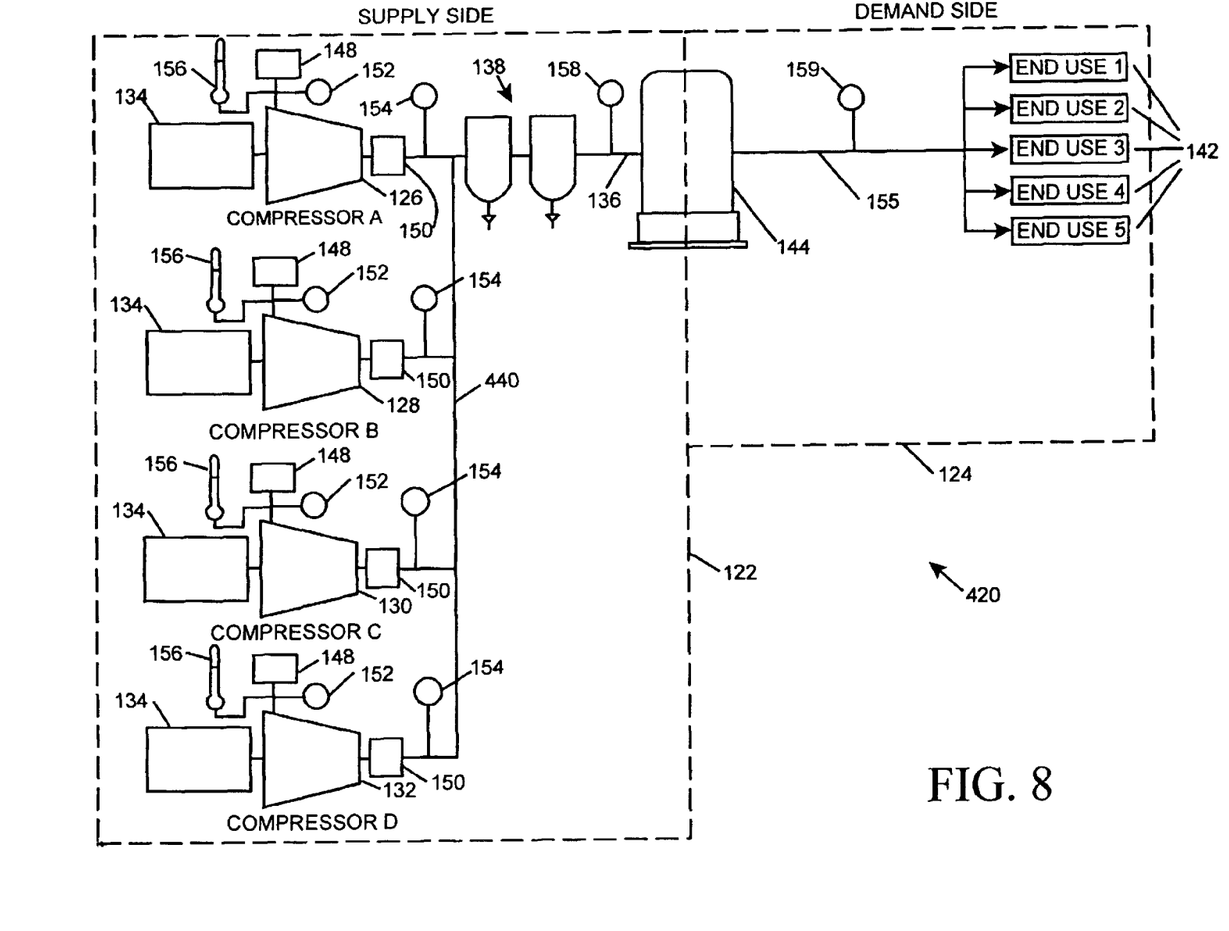
FIG. 8 is a block diagram of a second exemplary compressed gas distribution system suitable for employing the flow-responsive control system.

While the flow-responsive compressor control system provides the greatest efficiency gain when used with a compressed gas distribution system that includes a flow control, the compressor control system can substantially increase the efficiency of compressed gas distribution systems that do not include a flow control, such as the exemplary system 420 illustrated in FIG. 8. Components of the exemplary system 420 that have the same function as the corresponding component of exemplary system 120 are indicated with identical item numbers. A significant difference between the system 420 and the system 120 is the lack of a flow control to regulate the flow of compressed gas from the accumulator 144 to the demand side 124 of the system. The control system components and operating methods are the same as described above, but the base compressors are connected to the supply side piping 440, instead of the demand header 155. As a result, the base compressors supply base capacity (flow) at the supply pressure, as sensed at supply header 136 or accumulator 144. Since the supply pressure must be higher than the demand pressure in the demand header 155, more energy is required to compress the base capacity in the system 420 than is required when base capacity is compressed to demand pressure as in the exemplary system 120. However, the average pressure supplied by the compressors in system 420 is substantially less than that required by the cumulative operating pressure ranges of a pressure control system, such as exemplary system 20, and energy savings are substantial.

The flow-based control system and method improve the efficiency of compressed gas distribution systems by basing compressor capacity decisions more directly on system flow demands and facilitating compression at lower pressures. Substantial energy savings result when energy is not used to compress gas to unnecessarily high pressures.

The detailed description, above, sets forth numerous specific details to provide a thorough understanding of the present invention. In other instances, well-known methods, procedures, components, and circuitry have not been described in detail to avoid obscuring the present invention. For the sake of convenience, operations are described as interconnected functional blocks or distinct software and/or hardware modules. However, those skilled in the art will appreciate that the present invention may be practiced without these specific details and that in many cases functional blocks or modules can be equivalently aggregated into a logic device, a program, or operation with differing or vague boundaries. In any event, the functional blocks and software and/or hardware modules, or described features may be implemented by themselves, or in combination with other operations in either hardware or software.

All the references cited herein are incorporated by reference.

The terms and expressions that have been employed in the foregoing specification are used as terms of description and not of limitation, and there is no intention, in the use of such terms and expressions, of excluding equivalents of the features shown and described or portions thereof, it being recognized that the scope of the invention is defined and limited only by the claims that follow.

The invention claimed is:

1. A method of controlling operation of at least one compressor of gas for a distribution system, said method comprising the steps of:
    (a) selecting a strategy if a rate of change of a pressure of compressed gas in said distribution system exceeds a threshold rate of change, said strategy relating a flow of compressed gas and operation of at least one compressor; and
    (b) operating a compressor according to said selected strategy.

2. The method of claim 1 wherein the step of operating a compressor according to said selected strategy comprises the steps of:
    (a) staging a compressor if required to compress gas according to said selected strategy;
    (b) unloading a running compressor not required to compress gas according to said selected strategy; and
    (c) loading a compressor staged in step (a) to compress gas for said distribution system.

3. The method of claim 1 wherein the step of selecting a strategy if a rate of change of a pressure of compressed gas exceeds a threshold rate of change comprises the steps of:
    (a) comparing said rate of change of said pressure to said threshold for an interval of time; and
    (b) selecting said strategy if said rate of change exceeds said threshold for said interval.

4. The method of claim 3 wherein the step of operating a compressor according to said selected strategy comprises the steps of:

(a) staging a compressor if required to compress gas according to said selected strategy;

(b) unloading a running compressor not required to compress gas according to said selected strategy; and (c) loading a compressor staged in step (a) to compress gas for said distribution system.

5. The method of claim 1 further comprising the step of selecting a strategy if a pressure of compressed gas in said distribution system exceeds a threshold pressure.

6. The method of claim 5 wherein said pressure of said compressed gas comprises a sum of a demand pressure and a pressure margin.

7. The method of claim 5 wherein the step of operating a compressor according to said selected strategy comprises the steps of:

(a) staging a compressor if required to compress gas according to said selected strategy;

(b) unloading a running compressor not required to compress gas according to said selected strategy; and (c) loading a compressor staged in step (a) to compress gas for said distribution system.

8. The method of claim 1 further comprising the step of delaying said selection of said strategy if at least one of a time interval elapsing since a selection of a current strategy is less than a strategy shift interval and one of a substantially maximum and minimum flow of gas from compressors available to compress gas for said distribution system is achieved by a compressor operating according to said current strategy.

9. The method of claim 8 further comprising the step of selecting another strategy relating a flow of compressed gas and operation of at least one compressor if availability of a compressor changes.

10. A method of controlling operation of at least one compressor of gas for a distribution system, said method comprising the steps of:

(a) selecting a strategy for operating at least one compressor if a flow of gas has a relationship to a threshold flow specified for said strategy; and (b) operating a compressor according to said selected strategy.

11. The method of claim 10 wherein in the step of operating a compressor according to said selected strategy comprises the steps of:

(a) staging a compressor if required to compress gas according to said selected strategy;

(b) unloading a running compressor not required to compress gas according to said selected strategy; and (c) loading a compressor staged in step (a) to compress gas for said distribution system.

12. The method of claim 10 wherein the step of selecting a strategy for operating at least one compressor if a flow of gas has a relationship to a threshold flow specified for said strategy comprises the steps of:

(a) summing an output of compressed gas from at least one operating compressor;

(b) comparing said sum of said output to a threshold flow specified for selecting a strategy, and (c) selecting said strategy if said sum of said output is less than said threshold flow.

13. The method of claim 12 further comprising the steps of:

(a) staging a compressor if required to compress gas according to said selected strategy;

(b) unloading a running compressor not required to compress gas according to said selected strategy; and (c) loading any compressor staged in step (a) to compress gas for said distribution system.

14. The method of claim 12 wherein the step of summing an output of compressed gas from at least one operating compressor comprises the steps of:

(a) measuring a pressure at an inlet to said operating compressor;

(b) measuring a pressure at an outlet of said compressor;

(c) measuring a temperature at said inlet to said compressor;

(d) determining an output flow of compressed gas for said compressor according to a relationship of said inlet and outlet pressures and said inlet temperature; and (e) calculating a sum of said output flow of compressed gas for at least one operating compressor.

15. The method of claim 10 further comprising the step of delaying said selection of said strategy if at least one of a time interval elapsing since a selection of a current strategy is less than a strategy shift interval and one of a substantially maximum and minimum flow of gas from compressors available to compress gas for said distribution system is achieved by a compressor operating according to said current strategy.

16. The method of claim 15 further comprising the step of selecting another strategy relating a flow of compressed gas and operation of at least one compressor if an availability of a compressor to compress gas changes.

17. The method of claim 16 further comprising the steps of:

(a) staging a compressor if required to compress gas according to said another strategy;

(b) unloading a running compressor not required to compress gas according to said another strategy; and (c) loading any compressor staged in step (a) to compress gas for said distribution system.

18. A method of controlling operation of at least one compressor of gas for a distribution system, said method comprising the steps of:

(a) selecting a staging table comprising a plurality of strategies, a strategy relating operation of at least one available compressor and a flow of compressed gas;

(b) selecting a current strategy from said staging table;

(c) unloading a compressor not required to compress gas according to said current strategy;

(d) loading a compressor required to compress gas according to said current strategy;

(e) determining a flow of said compressed gas;

(f) determining a rate of change of a pressure of said compressed gas;

(g) selecting another strategy from said staging table if at least one of said rate of change of said pressure of said compressed gas has a relationship to a threshold rate of change of said pressure and said flow of said compressed gas has a relationship to a threshold flow for said current strategy; and (h) repeating steps (c) and (d) to operate at least one compressor according to said another strategy.

19. The method of claim 18 further comprising the step of delaying said selection of said another strategy if at least one of an interval elapsing since selection of said current strategy does not exceed a strategy shift interval and one of a substantially maximum and minimum flow of gas from compressors available to compress gas for said distribution system is achieved by operating according to said current strategy.

20. The method of claim 19 further comprising the step of selecting another staging table comprising a plurality of strategies if an availability of a compressor changes.

21. The method of claim 18 further comprising the step of selecting another strategy from said staging table if said pressure of said compressed gas has a relationship to a threshold pressure.

22. The method of claim 21 further comprising the step of delaying said selection of said another strategy if at least one of an interval elapsing since selection of said current strategy does not exceed a strategy shift interval and one of a substantially maximum and minimum flow of gas from compressors available to compress gas for said distribution system is achieved by operating according to said current strategy.

23. The method of claim 22 further comprising the step of selecting another staging table comprising a plurality of strategies if an availability of a compressor changes.

24. The method of claim 18 wherein the step of calculating a flow of compressed gas comprises the steps of:
  (a) calculating an output of compressed gas by a compressor according to a relationship of an inlet pressure and an outlet pressure for said compressor and an inlet temperature for said compressor; and
  (b) summing said output of compressed gas for compressors operating according to said current strategy.

25. A system for controlling operation of a compressor in a compressed gas distribution system, said system comprising:
  (a) a storage unit storing data for at least one staging table comprising a current strategy and at least one other strategy, a strategy comprising data relating a strategy shift gas flow and the operation of at least one compressor;
  (b) a data processor to select another strategy from said staging table and signal operation of a compressor identified in said another strategy if a flow of gas in said system has a relationship to said strategy shift gas flow specified for said current strategy; and
  (c) a controller to operate said compressor identified in said another strategy in response to said signal.

26. The apparatus of claim 25 further comprising:
  (a) a pressure sensor;
  (b) a temperature sensor; and
  (c) a data processor to calculate said flow of said gas in said system according to a relationship of a gas pressure sensed by said pressure sensor and a gas temperature sensed by said temperature sensor.

27. The apparatus of claim 25 further comprising a strategy shift timer to delay said selection of said another strategy if a strategy shift interval has not elapsed since a selection of said current strategy.

28. A system for controlling operation of a compressor in a compressed gas distribution system, said system comprising:
  (a) a storage unit storing data for at least one staging table comprising a current strategy and at least one other strategy, a strategy comprising data relating a strategy shift gas flow and the operation of at least one compressor;
  (b) a data processor to select another strategy from said staging table and to signal operation of a compressor identified in said another strategy if at least one of a flow of gas in said distribution system has a relationship to said strategy shift gas flow specified for said current strategy and a rate of change of a pressure of gas in said distribution system exceeds a threshold rate of change of pressure; and
  (c) a controller to operate said compressor identified in said another strategy in response to said signal.

29. The apparatus of claim 25 further comprising a strategy shift timer to delay said selection of said another strategy if a strategy shift interval has not elapsed since a selection of said current strategy.

30. A control for at least one compressor supplying compressed gas to a distribution system, said control comprising:
  (a) a gas pressure sensor;
  (b) a gas temperature sensor;
  (c) a storage unit storing data for at least one staging table comprising a current strategy and at least one other strategy, a strategy comprising data relating a strategy shift gas flow and operation of at least one compressor;
  (d) a data processing unit to determine a flow of gas in said distribution system according to a relationship of a pressure sensed by said gas pressure sensor and a temperature sensed by said gas temperature sensor and to signal operation of a compressor identified in said another strategy if at least one of a flow of gas in said distribution system has a relationship to said strategy shift gas flow specified for said current strategy and a rate of change of a pressure of gas in said distribution system exceeds a threshold rate of change of pressure; and
  (e) a controller to operate said compressor identified in said another strategy in response to said signal.

31. The apparatus of claim 30 further comprising a strategy shift timer to delay said selection of said another strategy if a strategy shift interval has not elapsed since a selection of said current strategy.

32. A compressed gas distribution system comprising:
  (a) a demand pipe for distributing gas to an end use thereof;
  (b) at least one base compressor connected to said demand pipe, said base compressor operable to flow gas to said demand pipe at a demand pressure;
  (c) an accumulator;
  (d) at least one trim compressor connected to said accumulator and operable to flow gas to said accumulator at a supply pressure, said supply pressure exceeding said demand pressure; and
  (e) a flow control regulating a flow of gas from said accumulator to said demand pipe.

33. The apparatus of claim 32 further comprising:
  (a) a data storage device storing at least one staging table comprising a plurality of strategies, a strategy relating an operation of a compressor and a strategy shift gas flow; and
  (b) a data processing unit selecting a strategy according to a relationship of a strategy shift gas flow for a strategy and an output of a compressor and operating a compressor according to said selected strategy.

34. The apparatus of claim 32 further comprising:
  (a) a demand pressure sensor;
  (b) a supply pressure sensor;

(c) a data storage device storing at least one staging table comprising a plurality of strategies, a strategy relating an operation of a compressor and a strategy shift gas flow; and (d) a data processing unit monitoring said demand pressure sensor and said supply pressure sensor; selecting a strategy according to at least one of a relationship of a strategy shift gas flow for a strategy and an output of a compressor, a rate of change of said supply pressure, a demand pressure; and operating a compressor according to said selected strategy.

35. A compressed gas distribution system comprising:

(a) a demand pipe for distributing gas to an end use thereof;

(b) an accumulator connected to said demand pipe;

(c) at least one gas compressor connected to said accumulator and operable to flow gas to said accumulator at a supply pressure;

(d) a data storage device storing at least one staging table comprising a plurality of strategies, a strategy relating an operation of a compressor and a strategy shift gas flow; and (e) a data processing unit selecting a strategy according to a relationship of a strategy shift gas flow for a strategy and an output of a compressor and operating a compressor according to said selected strategy.

* * * * *